US012579509B2

(12) United States Patent
Hanna

(10) Patent No.: US 12,579,509 B2
(45) Date of Patent: Mar. 17, 2026

(54) ASSET LOCATION SYSTEM AND METHOD OF USE

(71) Applicant: Molocar, Inc., Irving, TX (US)

(72) Inventor: Michael S. Hanna, Colleyville, TX (US)

(73) Assignee: Molocar, Inc., Irving, TX (US)

( * ) Notice: Subject to any disclaimer, the term of this patent is extended or adjusted under 35 U.S.C. 154(b) by 0 days.

(21) Appl. No.: 18/455,272

(22) Filed: Aug. 24, 2023

(65) Prior Publication Data

US 2023/0401533 A1 Dec. 14, 2023

Related U.S. Application Data

(63) Continuation of application No. 17/236,411, filed on Apr. 21, 2021, now Pat. No. 11,775,928, which is a continuation-in-part of application No. 15/178,910, filed on Jun. 10, 2016, now Pat. No. 11,019,471.

(60) Provisional application No. 62/174,034, filed on Jun. 11, 2015.

(51) Int. Cl.
*G06Q 10/087* (2023.01)
*G01S 5/02* (2010.01)

(52) U.S. Cl.
CPC .......... *G06Q 10/087* (2013.01); *G01S 5/0249* (2020.05); *G01S 5/0258* (2020.05)

(58) Field of Classification Search
CPC . G06Q 10/0833; H04L 67/2842; H04L 63/08; H04L 67/02; H04L 67/32; H04W 4/02; H04W 64/00; H04W 24/00; H04W 4/021; H04W 4/028; H04W 4/04; H04W 4/008;

H04W 64/003; H04W 84/12; G01S 11/02; G01S 11/12; G01S 13/04; G08B 13/1427; G08B 13/2462; G06K 2017/0045

See application file for complete search history.

(56) References Cited

U.S. PATENT DOCUMENTS

| | | | |
|---|---|---|---|
| 9,462,357 B2 | 10/2016 | Westick | |
| 2007/0252696 A1 | 11/2007 | Belisle | |
| 2008/0074265 A1 | 3/2008 | Schoen | |
| 2008/0231446 A1* | 9/2008 | Cresto | G06Q 10/087 |
| | | | 340/572.1 |
| 2009/0098907 A1 | 4/2009 | Huntzicker | |
| 2011/0172887 A1 | 7/2011 | Reeve | |
| 2011/0264940 A1* | 10/2011 | Lin | G06F 1/3203 |
| | | | 713/324 |
| 2013/0151558 A1 | 6/2013 | Sanchez | |
| 2014/0159905 A1* | 6/2014 | Thompson | H04W 4/029 |
| | | | 340/573.4 |
| 2014/0286326 A1 | 9/2014 | Jang | |
| 2014/0344895 A1 | 11/2014 | Jimenez Arreola | |
| 2015/0057926 A1* | 2/2015 | Gupta | G01C 21/165 |
| | | | 701/500 |
| 2015/0230100 A1 | 8/2015 | Atia | |
| 2015/0346313 A1 | 12/2015 | Smith | |
| 2016/0227359 A1* | 8/2016 | Hurewitz | G06Q 30/0261 |
| 2020/0143332 A1 | 5/2020 | Root | |

* cited by examiner

*Primary Examiner* — Fred A Casca

(57) ABSTRACT

An improved asset location system deploys gateways to communicate with transmitters that are disposed upon an asset. The gateway to create a web of interlocking area where the gateways communicate with the same transmitters. These measurements are combined to increase the accuracy of location data provided to track or locate assets within an operations area.

20 Claims, 8 Drawing Sheets

201

303 — INDIVIDUAL ASSETS ARE PAIRED TO TRANSMITTERS

305 — TRANSMITTERS CONVEY ASSET INFORMATION AND LOCATIONS TO A DATABASE

307 — ONE OR MORE DEVICES QUERY THE DATABASE FOR ASSET INFORMATION AND LOCATIONS

309 — INTERACTIVE DISTANCE DETERMINATION PROCESS

311 — VISUALIZATION OF ASSET LOCATION AND INFORMATION ON QUERYING DEVICE

309

403 — ASSET LOCATION PROVIDED TO QUERYING DEVICE

405 — DISTANCE BETWEEN QUERYING DEVICE AND ASSET OF INTEREST RECORDED

407 — DISTANCE BETWEEN QUERYING DEVICE AND OTHER ASSETS RECORDED

409 — ALGORITHM NORMALIZES HISTORICAL AND REAL TIME DATA FOR STEPS 403 - 407

411 — ALGORITHM REMOVES ANOMALOUS DATA

ASSET LOCATION SYSTEM AND METHOD OF USE

CROSS REFERENCE TO RELATED APPLICATIONS

This application is a continuation claiming the benefit of priority under 35 U.S.C. § 120 based on co-pending U.S. patent application Ser. No. 17/236,411 (now patented as U.S. Pat. No. 11,775,928) which was filed on Apr. 21, 2021, which claims the benefit of priority under 35 U.S.C. § 120 based on U.S. patent application Ser. No. 15/178,910 (now patented as U.S. Pat. No. 11,019,471) which was filed on Jun. 10, 2016, which itself claimed the benefit of priority under 35 USC 119 (e) based on U.S. Provisional Patent Application No. 62/174,034 filed on Jun. 11, 2015. The contents of each of these aforementioned applications are incorporated herein by reference in their entirety.

BACKGROUND

Field of the Invention

The present invention relates generally to asset location systems and more specifically to improved asset location systems for car dealerships.

Description of Related Art

Systems for locating one or more assets are well known in the art. For example, FIG. 1 depicts a conventional dealership system 101 wherein a salesman 105 assists a customer 107 in locating a vehicle 109 within a parking lot 103.

Problems commonly associated with system 101 include inefficient and time consuming efforts in physically searching for vehicle 109. Further, these problems are prone to increase with human error, poor asset management, or large lot sizes.

Although great strides have been made in the area of asset location and management systems for car dealerships, many shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
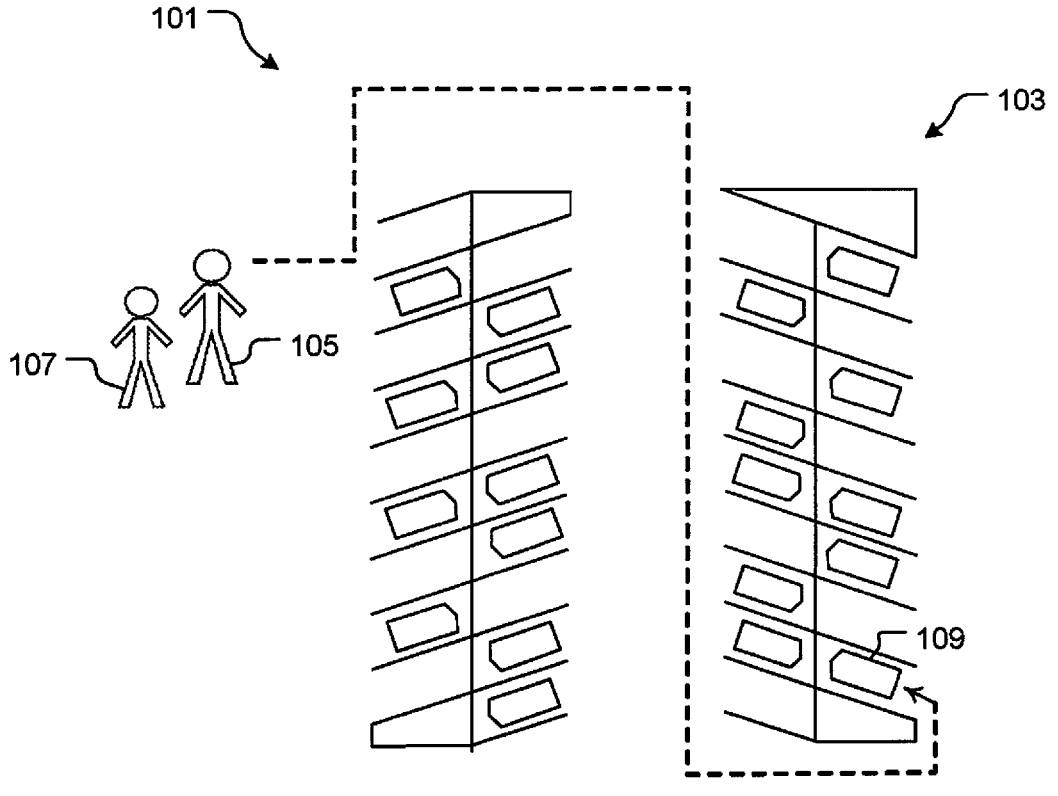
FIG. 1 is a top view of an asset location system at a conventional dealership.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional asset location and management systems. Specifically, the system and method of use of the present application provide efficient, automated means to locate and manage assets across a large area and with minimal risk of human error. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
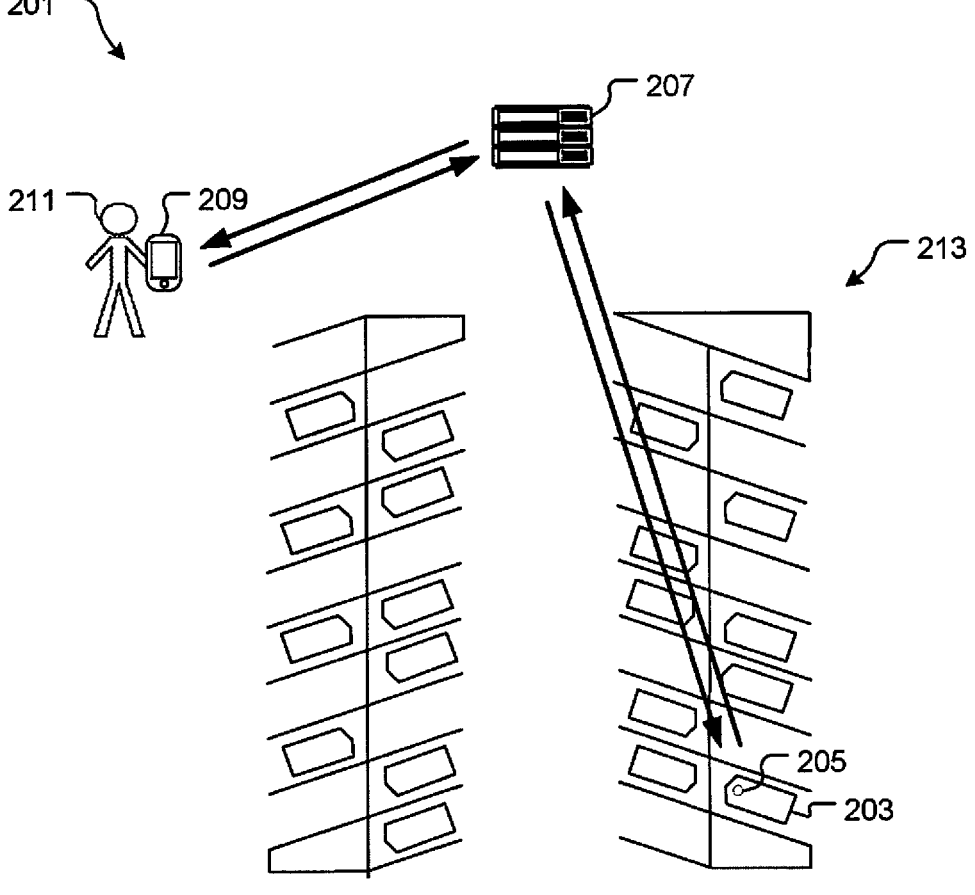
FIG. 2 is a top view of an interactive asset location and management system in accordance with a preferred embodiment of the present application.

Referring now to the drawings wherein like reference characters identify corresponding or similar elements throughout the several views, FIG. 2 depicts a top view of an interactive asset location and management system 201 in accordance with a preferred embodiment of the present application. System 201 comprises an asset 203 paired to a transmitter 205 in wireless communication with a database 207 that is also in wireless communication with a querying device 209 such as a cellphone, it should be understood the querying the device could be any other computing device that is capable of sending and receiving data.

It is contemplated and will be appreciated that transmitter 205 can be made highly cost effective by using a low energy beacon such as Bluetooth that does not rely on geo-positioning or cellular technology and can be paired to asset 203 via transmitted IDs. It will be further appreciated a user 211 can use querying device 209 to search for asset 203 via parameters such as stock number, asset ID, VIN #, or location within a parking lot 213. And that the asset can be paired to the transmitter 205.

Figure 3:
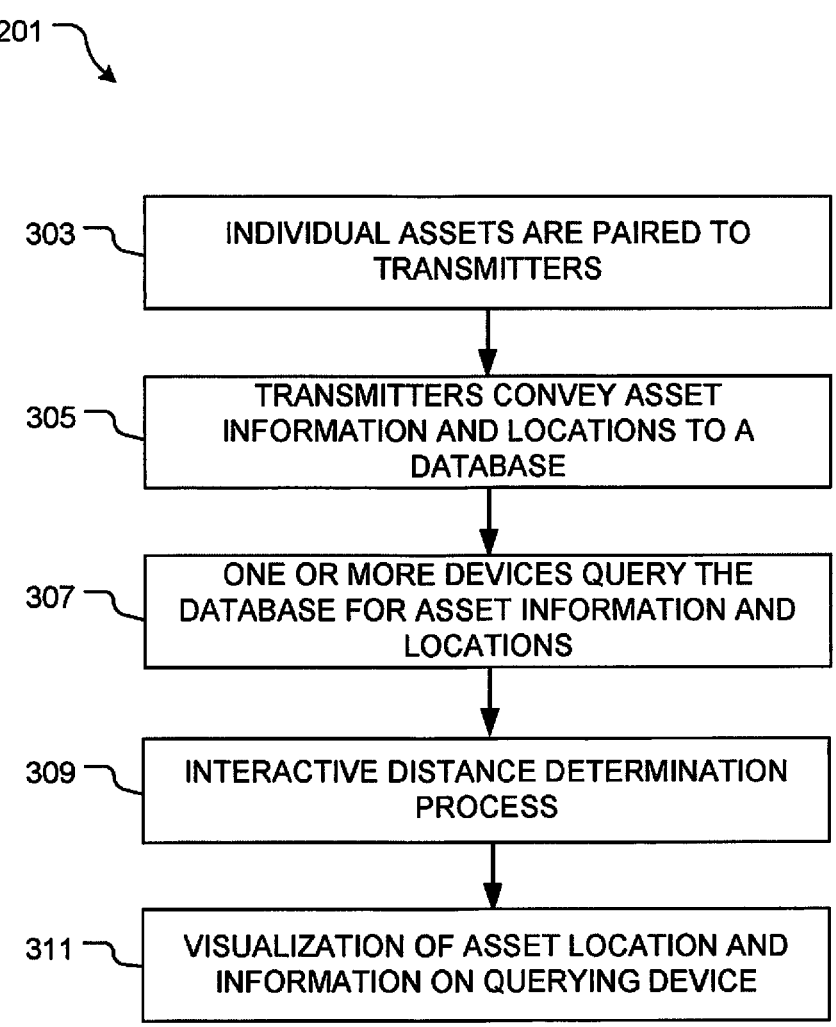
FIG. 3 is a flowchart defining the process of FIG. 2.

Referring now to FIG. 3, a flowchart defining the process of FIG. 2 is shown. As described above system 201 comprises the following steps: individual assets paired to transmitters 303, said transmitters conveying asset information and locations to a database 305, one or more devices querying the database for asset information and locations 307, an interactive distance determination process 309, and the visualization of asset location and information on the querying device 311. Where the transmitters provide a signal that allows the database to retrieve information related to the asset.

One of the unique features believed characteristic of the present application is that system 201 implements an interactive distance determination process and visualization software as demonstrated by steps 309 and 311 of FIG. 3, respectively.

Figure 4:
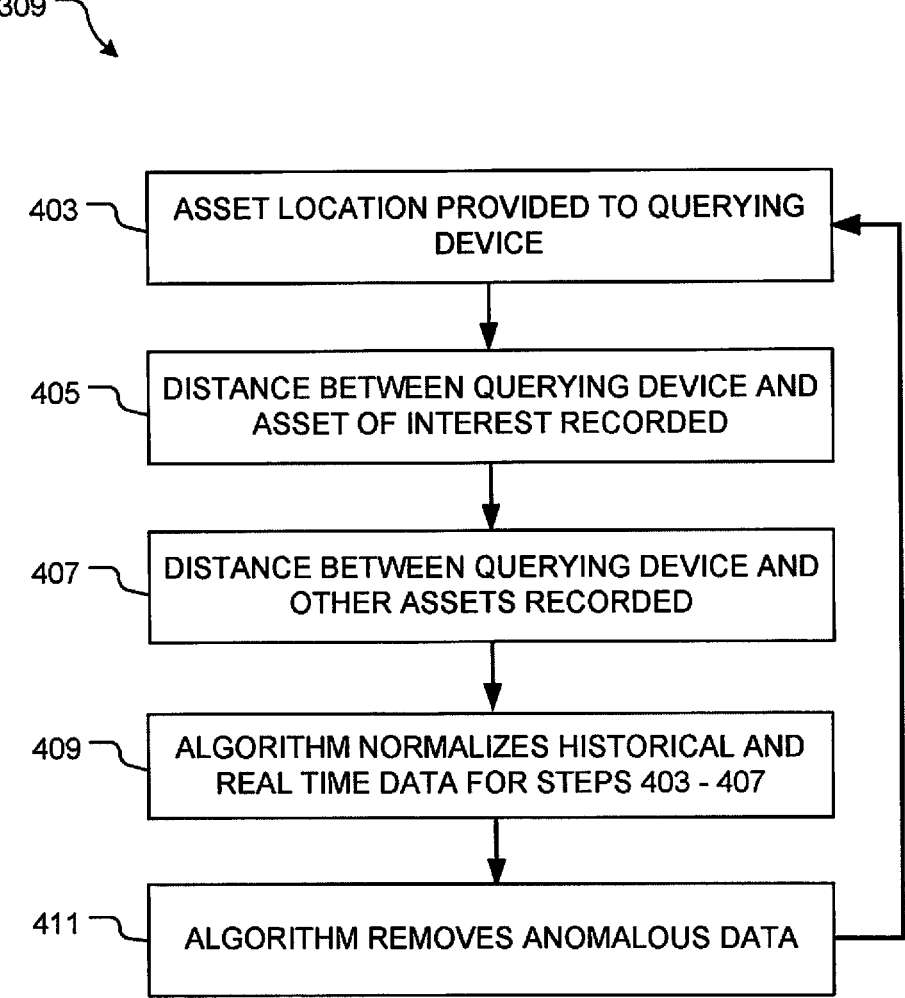
FIG. 4 is a flowchart defining the interactive distance determination subprocess of FIG. 3.

Referring now to FIG. 4 the interactive distance determination process of step 309 is shown. Here, step 309 incorporates a self-improving algorithm that provides asset location information 403 and distance 405 to a querying device (not shown). To increase the precision of asset location information 403 the algorithm also measures the distance of the querying device from other asset locations 407, normalizes all historical location data with real-time updates 409, and removes any anomalous data 411.

An alternative embodiment significantly enhances the interactive distance determination process of step 309 by also incorporating stationary transmitters that identify fixed location information to a querying device. For example, stationary transmitters will allow the self-improving algorithm to determine on which floor an asset is located within a parking garage.

It is contemplated that steps 309 and 311 can be used to show asset 203 in a spreadsheet, on a map, by received signal strength indication (RSSI), or by any other useful form of presentation.

It is also contemplated that transmitter 205 can include sensors such as accelerometers or thermometers (not shown) that inform the database 207 and user 211 of important status changes such as asset 203 relocation or harmful interior temperatures that could result in higher maintenance costs. It will be appreciated that this functionality can be paired with software to automatically assign and track employee tasks. For example, software can associate changes to an asset's location with the querying device nearest the asset at that time to determine who would have moved the asset and to automatically task that individual with returning the asset.

An alternative embodiment for system 201 contemplates integrating steps 309 and 311 with sales data and time stamps to optimize where each asset 203 should be located within parking lot 213 to maximize sales. Another alternative embodiment contemplates integrating steps 309 and 311 with a customer relationship management platform (CRM) that can, for example, interact with the social media content of potential customers to pre-identify each customer's vehicle preferences, assign employee tasks, or alert asset owners to consumer trends. It will be appreciated that these alternative embodiments will enhance the sales experience, particularly if the respective querying devices of the employee and customer recognize proximity to each other and correlate customer preferences with inventory.

Figure 5:
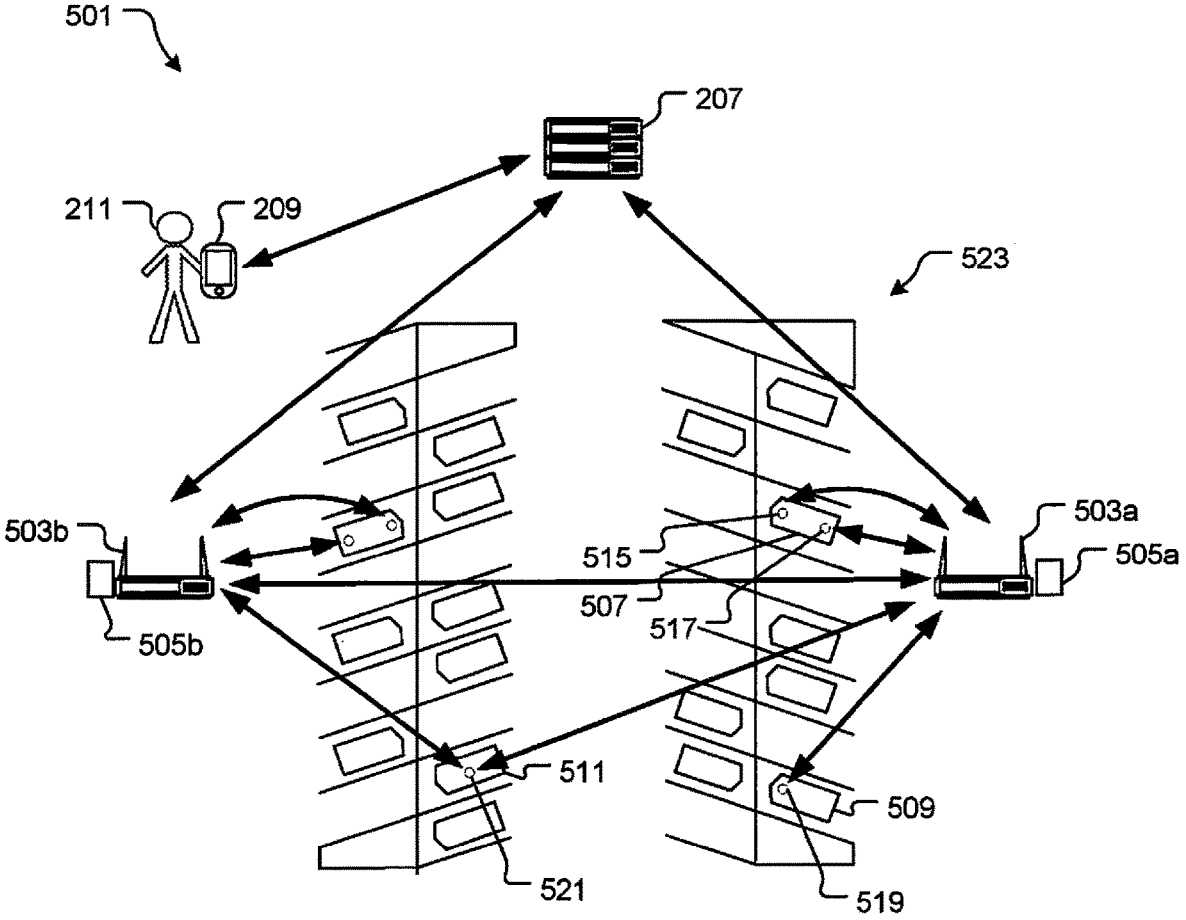
FIG. 5 is a top view of an alternative embodiment of the system of FIG. 2.

Referring now to FIG. 5 an alternative embodiment of the system 201 is depicted. Embodiment 501 includes similar features as system 201 but also includes gateways 503 each with a transmitter 505 attached thereto and in electrical communication therewith. A first asset 507 has a first transmitter tag 515 and a second transmitter tag 517 attached at different physical placed of the asset. For example, the asset is a car, and the first transmitter is attached near the front of the car and the second transmitter is attached near the rear of the car. Embodiment 501 includes a second asset 509 with a first single transmitter tag 519 and third asset 511 with a second single asset tag 521.

The gateways 503 broadcast their signal over a range that could be less than the area of operations 523 such as the parking lot of system 201. The gateways 503 gather data from all of the transmitters within this range. When the first transmitter 515 and second transmitter 517 of the first asset 507 communicate with the gateways 503 the position and facing of the asset are determined either by the gateway 503 or the database 207.

It will be understood that in this embodiment multiple gateways 503 communicate with the same transmitter such as with third asset 511 and its transmitter 521. The data from both gateways 503 is combined by the database so that the location of the third asset 511 is a conglomeration of all the measurements taken by the system. It will be appreciated that multiple communications and the resulting measurements increase the accuracy and precision of the embodiment 501.

It is contemplated that the gateways 503 with their attached transmitter tags 505 communicate with each other to produce a measure of signal strength within the system. Therefore gateways 503 with transmitter tags 505 are strategically placed around the area of operations 523 and their location data taken to create a web thereof to provide a holistic view of the assets therein. Algorithms in the database detect weak areas within the web, combine data from all of the gateways for each asset, and determine the relationship between the assets such as distance. These weak areas could be created by obstacles such as walls, metallic objects, furniture and the like that refract or reflect propagated waves from the transmitters to the gateways. It is however contemplated that within the operating area 523 that there could be a single gateway that captures data from the transmitters in a subset of the operating area where no other gateway reaches. The gateway could preprocess the data obtained prior to communicating the data to the database. The known data from the placement of the gateways provides reference data to improve or facilitate the function of the algorithms within the database.

Additionally, the communication between a transmitter tag 505 and a gateway 503 determines line of sight therebetween. When the communication therebetween is interrupted the gateway 503 determines that there is an obstruction and that an asset could the obstruction. If an asset is the obstruction and the asset has a transmitter tag then the system verifies both the obstruction and the location of the asset.

As the asset moves within the area of operations 523 the change in single strength between the transmitter tag and the gateway will change. This measure of the signal strength could be used the algorithms in the database 207 to provide an accuracy value for the location of each transmitter and thereby each asset. For example, the position of a car could be given as 100 feet from the building within 10 feet, so that the car is from 90 feet to 110 feet from the building.

Figure 6:
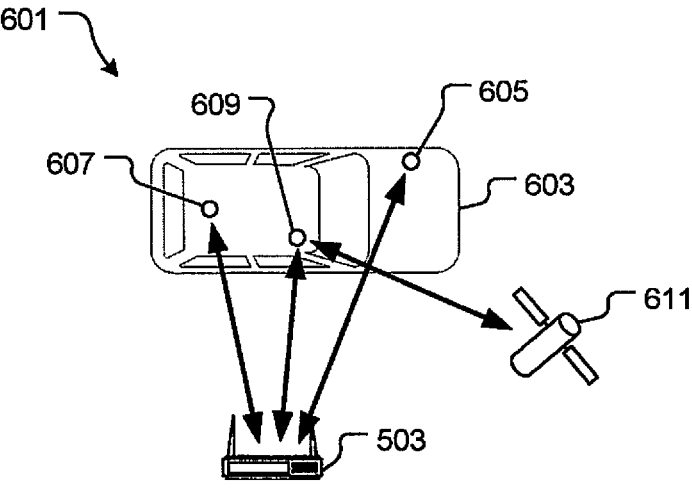
FIG. 6 is top view of the asset of FIG. 5.

To further increase the accuracy of the system additional data could be used as is depicted by FIG. 6. Embodiment 601 includes an asset 603 with a first transmitter tag 605 and a second transmitter tag 607 in electronic communication with a gateway 503. The asset 603 also has a tertiary transmitter 609 such as a GPS device in electronic communication with a GPS network 611. The data from the tertiary device 609 is also sent to the gateway 503. It is also contemplated that the system 201 could obtain measurements or other data from the tertiary device 609 through some other means and the present embodiment is given as an example only. By combining the measurements taken by the gateway 503 with that of the tertiary device 609 the position, disposition, or other attributes of the asset are improved.

It is contemplated that the tertiary device 609 also augments and expands the range of the system beyond what the gateways 503 are capable of. For example, when in the parking lot the data from the transmitter tags is sufficient but the addition of the GPS device allows the exit of the car from the lot to be identified, the trip that it takes, and its return to the parking lot are captured thereby. The database via the gateway 503 manages the transition the location tracking of the asset from the tertiary device 609 to the first transmitter tag 605.

For example, the signal and accuracy of the first transmitter tag 605 and tertiary device 609 are monitored by the system and the data from each is used when more accurate than the other, such as when a vehicle enters a building where a GPS signal does not reach the vehicle.

Figure 7:
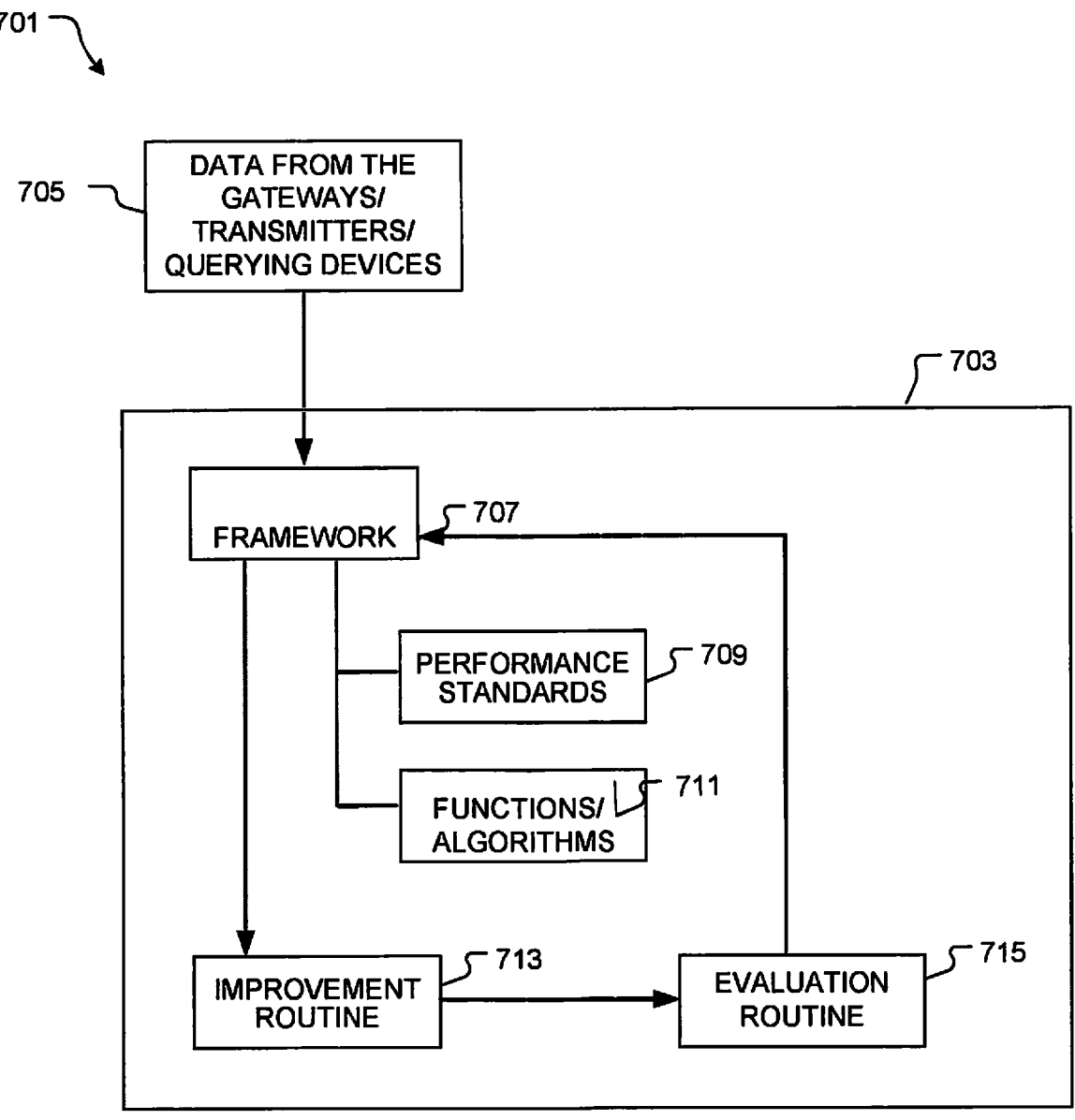
FIG. 7 is a schematic of one embodiment of the database of FIG. 5.

Referring now to FIG. 7, it is contemplated that the database 207 could have a learning module 703 that utilizes data 705 from the system to populate a framework 707 such as a neural network or artificial intelligence. The framework 707 could include performance standards 709, functions or algorithms 711 or other data structures that allow the framework 707 to alter the performance of the system through an improvement routine 713. The improvement routine 713 creates, recommends, or actuates changes in the system with the goal of improving the performance thereof. An evaluation routine 715 monitors the changes within the system and reports to the framework 707 the results of the changes. For example, the framework 707 collects data relative to the area of coverage of the gateways within the system, a weak area of coverage is identified and the improvement routine 713 suggest the addition of new gateways or boost the strength of existing gateways to cover the weak area. The evaluation routine 715 monitors the change and reports on the effective coverage of the identified weak area.

In another example, location specific data from the gateways (e.g. latitude and longitude measurements) is received by the framework 707 where an algorithm uses weights and biases along with a cost function to increase the accuracy of system.

It is further contemplated that historical data collected from the system of similar embodiments could be accepted by the learning module 703 to improve the system. For example, if assets move with regular patterns or if obstruction appear on scheduled times these behaviors and their solutions could be rapidly implemented by the improvement routine 713 at the outset of the implementation of the system.

Figure 8:
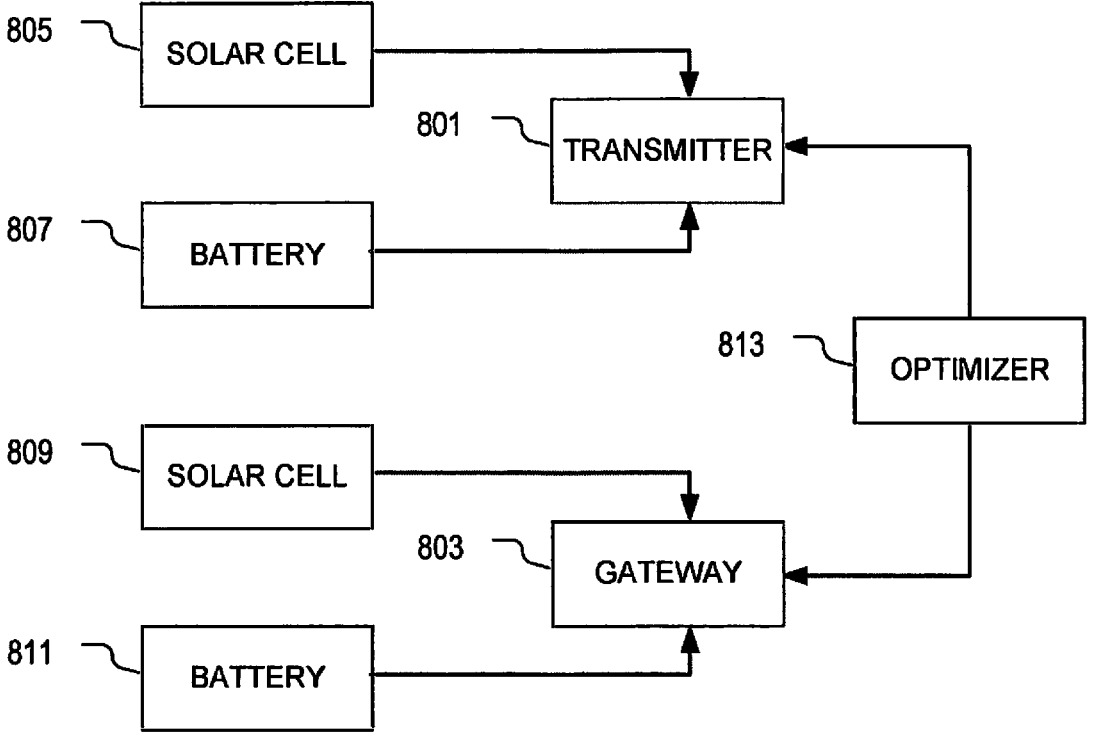
FIG. 8 is a schematic of the use of an optimizer.

It is contemplated that the system could have the ability to adapt its own performance. Referring to FIG. 8, an optimizer 813 monitors the usage of power consumption by a transmitter 801 and a gateway 803. The transmitter is be powered by a first solar cell 805 or a first battery 807, likewise the gateway 803 is be powered by a second solar cell 809 or a second battery 811. The optimizer 813 adjust the power consumption of the transmitter 801 and to a specific transmit strength or broadcast frequency so that the system network becomes synchronized thereby so that transmitter and the gateway communicate with a minimum of power.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An asset movement and location determination system comprising:
   a plurality of transmitter tags attached to each asset of a plurality of assets, each of the transmitter tags comprising a low energy beacon transmitter and being programmed with a unique identifier, the plurality of transmitter tags associated with a device to determine the location of the plurality of transmitter tags;
   a plurality of gateways disposed on a premises that communicate with at least a portion of the plurality of transmitter tags; and
   a database that enables algorithms to compute data from the plurality of gateways;
   wherein the algorithms combine data from multiple gateways relative to the same transmitter tag to locate or otherwise provide information relative to the asset associated with the transmitter tag; and
   wherein, based on a loss of low energy beacon signal or reduction of low energy beacon signal quality from a first one of the plurality transmitter tags, the system is configured to determine that a first asset of the plurality of assets has departed from the premises.

2. The system of claim 1 further comprising at least one GPS device disposed in the first asset.

3. The system of claim 2, wherein the system determines the position of the first asset by using a GPS position provided by the at least one GPS device once a received signal strength from the first transmitter tag has degraded below a predetermined level.

4. The system of claim 1, wherein the algorithms are configured to utilize a received signal strength to provide an accuracy value for a location of the first one of the plurality of transmitter tags.

5. The system of claim 2, wherein the system is configured to determine whether an asset has entered a building in response to a loss of GPS signal by the at least one GPS device.

6. The system of claim 2, wherein the system is configured to determine whether the at least one GPS device or the first one of the plurality of transmitter tags is more accurate.

7. The system of claim 1, wherein the asset is an automobile.

8. The system of claim 7, wherein the premises is an automobile dealership lot.

9. The system of claim 8, further comprising a querying device, wherein the querying device may be utilized to locate an asset using at least one of a stock number, an asset ID, and a VIN.

10. The system of claim 1, wherein the algorithms are configured to increase the precision of asset locations by normalizing historical location data with real-time updates and removing anomalous data.

11. An asset movement and location determination system comprising:

a first transmitter tag attached to a first asset, wherein the first transmitter tag comprises a low energy beacon transmitter and is programmed with a first unique identifier, the first transmitter tag associated with a locating device to determine the location of the first transmitter tag;

a second transmitter tag attached to a second asset, wherein the second transmitter tag comprises a low energy beacon transmitter and is programmed with a second unique identifier, the second transmitter tag associated with the locating device;

at least one gateway disposed on a premises and configured to communicate with the first and the second transmitter tags; and a database that enables algorithms to compute data from the at least one gateway;

wherein the algorithms are configured to combine data from multiple gateways relative to the same transmitter tag to locate or otherwise provide information relative to the asset associated with the transmitter tag; and wherein, based on a received low energy beacon signal strength from the first transmitter tag degrading below a predetermined level, the system is configured to determine that the first asset has departed from the premises.

12. The system of claim 11, further comprising a first GPS device disposed in the first asset.

13. The system of claim 12, wherein the system determines the position of the first asset by using a GPS position provided by the first GPS device once the received signal strength from the first transmitter tag has degraded below a second predetermined level.

14. The system of claim 11, wherein the unique identifier corresponding to the first transmitter tags is stored in the database and wherein the database is further configured to associate additional parameters about the assets.

15. The system of claim 14, wherein the additional parameters comprise at least one of a stock number, an asset ID, and a VIN.

16. The system of claim 15, further comprising a querying device, wherein the querying device may be utilized to locate the first asset using at least one of the stock number, the asset ID, and the VIN.

17. The system of claim 11, wherein the first transmitter tag is in communication with a plurality of gateways.

18. A method of deploying an asset movement and location determination systems, the method comprising:

programming a first transmitter tag with a first unique identifier, wherein the first transmitter tag is configured to be attached to a first asset, wherein the first transmitter tag comprises a low energy beacon transmitter;

programming a second transmitter tag with a second unique identifier, wherein the second transmitter tag is configured to be attached to a second asset, wherein the second transmitter tag comprises a low energy beacon transmitter;

associating the first transmitter tag and the second transmitter tag with a locating device to determine the respective locations of the first transmitter tag and the second transmitter tag;

deploying a first gateway disposed on a premises and configuring the first gateway to communicate with the first and second transmitter tags;

deploying a second gateway on the premises and configuring the second gateway to communicate with the first and second transmitter tags;

provisioning a database that enables algorithms to compute data from the first and second gateways;

wherein the algorithms are configured to combine data from multiple gateways relative to the same transmitter tag to locate or otherwise provide information relative to the asset associated with the transmitter tag; and determining, based on a received low energy beacon signal strength from the first transmitter tag degrading below a predetermined level, that the first asset has departed from the premises.

19. The method of claim 18, further comprising providing location information to a querying device.

20. The method of claim 19, wherein the location information is provided to the querying device based on a query utilizing at least one of a stock number, an asset ID, and a VIN.

* * * * *